(12) United States Patent
Masoudipour et al.

(10) Patent No.: US 8,678,310 B2
(45) Date of Patent: Mar. 25, 2014

(54) DUCTED RAM AIR GENERATOR ASSEMBLY

(75) Inventors: Mike Medhi Masoudipour, Torrance, CA (US); Steven Robert Eccles, Torrance, CA (US); Wayne Schindler, Huntington Beach, CA (US); Edward Mark Down, Tucson, AZ (US); Filip Reinis, Long Beach, CA (US); Roger Murry, San Pedro, CA (US)

(73) Assignee: Honeywell International Inc., Morristown, NJ (US)

( * ) Notice: Subject to any disclaimer, the term of this patent is extended or adjusted under 35 U.S.C. 154(b) by 347 days.

(21) Appl. No.: 13/215,129

(22) Filed: Aug. 22, 2011

(65) Prior Publication Data

US 2013/0048780 A1 Feb. 28, 2013

(51) Int. Cl.
*B64D 41/00* (2006.01)
*B64D 27/02* (2006.01)
*H02P 9/04* (2006.01)

(52) U.S. Cl.
USPC ............... 244/58; 244/55; 244/53 B; 290/44

(58) Field of Classification Search
USPC ............... 244/53 R, 54, 55, 58, 137.4, 53 B; 290/44, 55; 180/2.1, 2.2; 60/39.183, 60/802, 767
See application file for complete search history.

(56) References Cited

U.S. PATENT DOCUMENTS

| | | | |
|---|---|---|---|
| 3,098,632 A * | 7/1963 | Christenson | 244/135 R |
| 3,621,930 A * | 11/1971 | Dutchak | 180/65.31 |
| 4,477,040 A * | 10/1984 | Karanik | 244/58 |
| 4,864,812 A | 9/1989 | Rodgers et al. | |
| 4,917,332 A * | 4/1990 | Patterson, Jr. | 244/58 |
| 4,991,796 A | 2/1991 | Peters et al. | |
| 5,150,859 A * | 9/1992 | Ransick | 244/58 |
| 5,165,228 A * | 11/1992 | Enderle | 60/244 |
| 5,680,032 A * | 10/1997 | Pena | 290/52 |
| 5,687,561 A | 11/1997 | Newton | |
| 5,934,612 A * | 8/1999 | Gerhardt | 244/58 |
| 6,127,758 A | 10/2000 | Murry et al. | |
| 6,270,309 B1 | 8/2001 | Ghetzler | |
| 6,467,725 B1 | 10/2002 | Coles et al. | |
| 6,580,179 B2 | 6/2003 | Eccles et al. | |
| 7,077,631 B2 | 7/2006 | Eccles et al. | |
| 7,368,828 B1 * | 5/2008 | Calhoon | 290/55 |
| 7,708,527 B2 | 5/2010 | Eccles et al. | |
| 7,812,472 B2 * | 10/2010 | Allaei | 290/44 |
| 7,841,163 B2 | 11/2010 | Welch et al. | |
| 7,982,328 B2 * | 7/2011 | Huntemann | 290/55 |
| 8,148,841 B1 * | 4/2012 | Apthorp | 290/55 |
| 8,436,485 B1 * | 5/2013 | Smith | 290/55 |
| 2005/0104379 A1 * | 5/2005 | Haskill | 290/44 |

(Continued)

FOREIGN PATENT DOCUMENTS

WO WO 2010097213 A2 * 9/2010

*Primary Examiner* — Joseph W Sanderson
(74) *Attorney, Agent, or Firm* — Shimokaji & Associates, P.C.

(57) ABSTRACT

A ducted ram air turbine may be used to drive a generator to provide power to an aircraft. The ducted ram air turbine may be used in a pod attached to the aircraft, where the pod is fully powered, cooled and lubricated by devices attached to the ram air turbine. A gearbox may be deployed to control the speed of the turbine for driving various pumps and the like. The speed of the turbine may be controlled by inlet and exit actuators driving inlet and exit doors.

13 Claims, 4 Drawing Sheets

(56) References Cited

U.S. PATENT DOCUMENTS

| | | | |
|---|---|---|---|
| 2008/0061559 A1* | 3/2008 | Hirshberg | 290/55 |
| 2008/0150293 A1* | 6/2008 | Calhoon | 290/55 |
| 2009/0026770 A1 | 1/2009 | Huntemann | |
| 2010/0133849 A1* | 6/2010 | Allaei | 290/55 |
| 2010/0207389 A1* | 8/2010 | Nyffenegger | 290/44 |
| 2010/0310361 A1* | 12/2010 | Carre | 415/199.5 |
| 2011/0067393 A1 | 3/2011 | Chase | |
| 2011/0101698 A1* | 5/2011 | Saluccio | 290/55 |
| 2012/0006938 A1* | 1/2012 | Gatzke | 244/58 |
| 2013/0048780 A1* | 2/2013 | Masoudipour et al. | 244/58 |
| 2013/0248657 A1* | 9/2013 | Riordan | 244/53 B |

\* cited by examiner

DUCTED RAM AIR GENERATOR ASSEMBLY

BACKGROUND OF THE INVENTION

The invention relates to ram air turbine systems. More specifically, the invention relates to a ram air turbine system that provides electrical power and cooling for an aircraft pod.

Ram air turbine systems provide electrical power and cooling to electronic equipment inside self-contained pods of military aircraft. A ram air turbine system typically includes a propeller that is mounted external to the aircraft pod. When placed in the airstream, the propeller drives an electrical generator, which generates electrical power for the electronic equipment. Cooling is provided by allowing ram air to enter the pod and directly exposing the electronic equipment to the ram air.

This type of externally bladed ram air turbine system has several disadvantages including increased aerodynamic drag and secondly, with the turbine located at the leading edge of the pod, results in reduced forward looking jamming equipment performance and a decreased field of view.

As the electronic equipment becomes more advanced, it will become more power-hungry and less tolerant to heat. Unless the present ram air turbine systems are increased in size and weight, they will not be capable of providing sufficient electrical power and cooling to the advanced electronic equipment. However, increasing the size, weight, drag and valuable frontal pod location of the ram air turbine system is a luxury that cannot be afforded.

Referring to FIG. 1, an aircraft 100 may include a pod 110. The pod 110 may include a ram air turbine 120 adapted to supply power to the pod 110. In some embodiments, the pod 110 may be used for as a jamming module designed to disrupt accurate radar reflections and prevent detection. The ram air turbine 120 may turn regardless of whether the pod 110 is operating since the turbine itself is disposed external to the pod 110. Furthermore, the speed of the turbine may be variable, depending on flight speed.

As can be seen, there is a need for an improved ram air turbine design that may further be utilized in an aircraft pod.

SUMMARY OF THE INVENTION

In one aspect of the present invention, a ducted ram air turbine assembly comprises a duct having an inlet and an outlet; an inlet door adapted to variably open and close the inlet; an outlet door adapted to variably open and close the outlet; a ram air turbine disposed inside the duct; a generator driven by the ram air turbine; and a gearbox adapted to adjust an input speed of the generator.

In another aspect of the present invention, a ducted ram air turbine assembly comprises a duct having an inlet on a first side of a pod and an outlet on a second side of the pod; an inlet door adapted to variably open and close the inlet; an outlet door adapted to variably open and close the outlet; a ram air turbine disposed inside the duct; a generator driven by the ram air turbine, wherein the generator provides power exclusively to components within the pod.

In a further aspect of the present invention, a pod adapted to attach to an aircraft comprises ducted ram air turbine assembly which comprises a duct through the pod, the duct having an inlet and an outlet; an inlet door adapted to variably open and close the inlet; an outlet door adapted to variably open and close the outlet; a ram air turbine disposed inside the duct; and a generator driven by the ram air turbine.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a ducted ram air turbine that may be used to drive a generator to provide power to an aircraft. The ducted ram air turbine may be used in a pod attached to the aircraft, where the pod is fully powered, cooled and lubricated by devices attached to the ram air turbine. A gearbox may be deployed to control the speed of the turbine for driving various pumps and the like. The speed of the turbine may be controlled by inlet and exit actuators driving inlet and exit doors.

Figure 1:
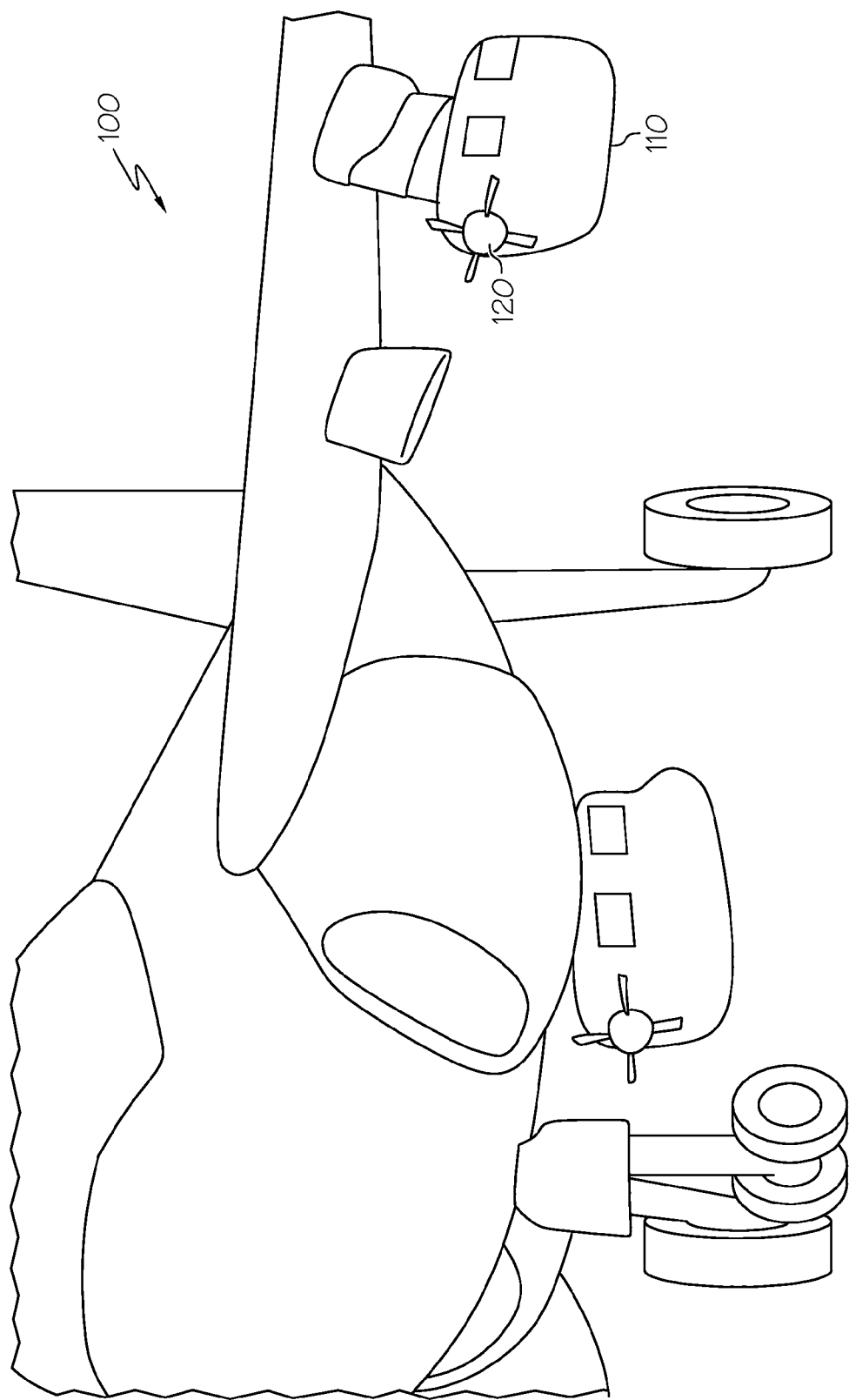
FIG. 1 is perspective view of an aircraft with a pod incorporating a conventional ram air turbine.
Figure 2:
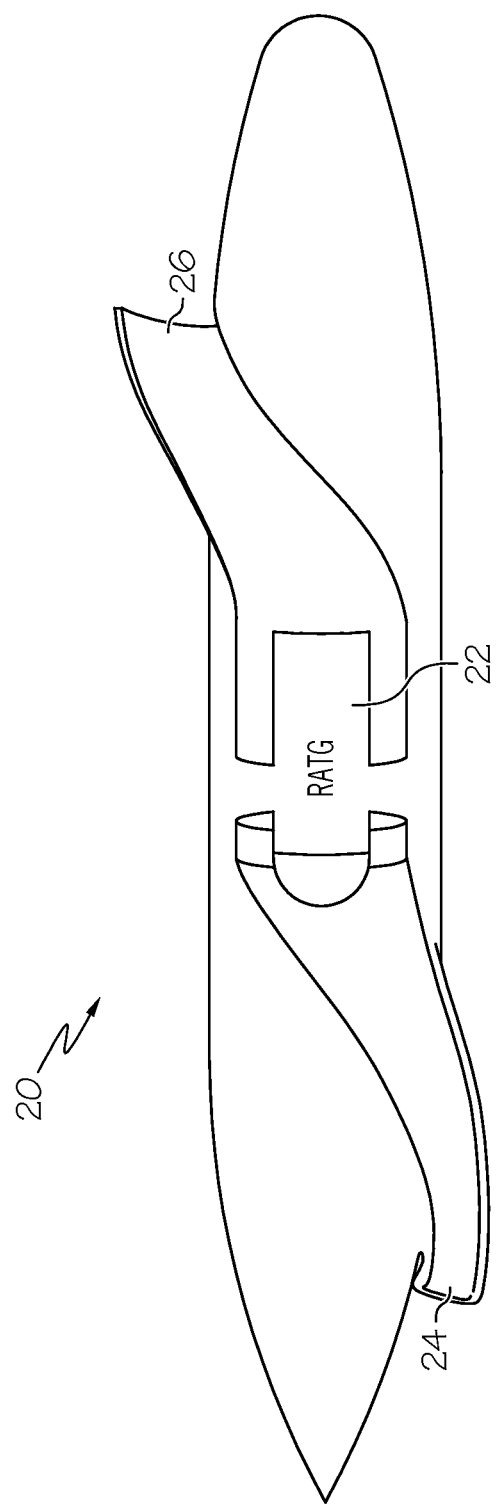
FIG. 2 is cross-sectional view of a ducted ram air turbine disposed in a pod according to an exemplary embodiment of the present invention.

Referring to FIG. 2, there is shown a schematic view of a pod 20 that may include a ram air turbine (RAT) generator 22. The pod 20 may have an inlet 24 and an outlet 26. Air flow through the RAT generator 22 may be controlled by doors (not shown, see FIGS. 2 and 3) at the inlet 24 and the outlet 26. In some embodiments, the pod 20 may be a radar jamming pod disposed on an aircraft (not shown). In some embodiments, the pod 20 may be self-contained, meaning that the pod 20 may provide for its own power via the RAT and the RAT may also drive other components, such as a coolant pump to cool the pod's arrays and antennas, a lubrication pump and the like.

Figure 3:
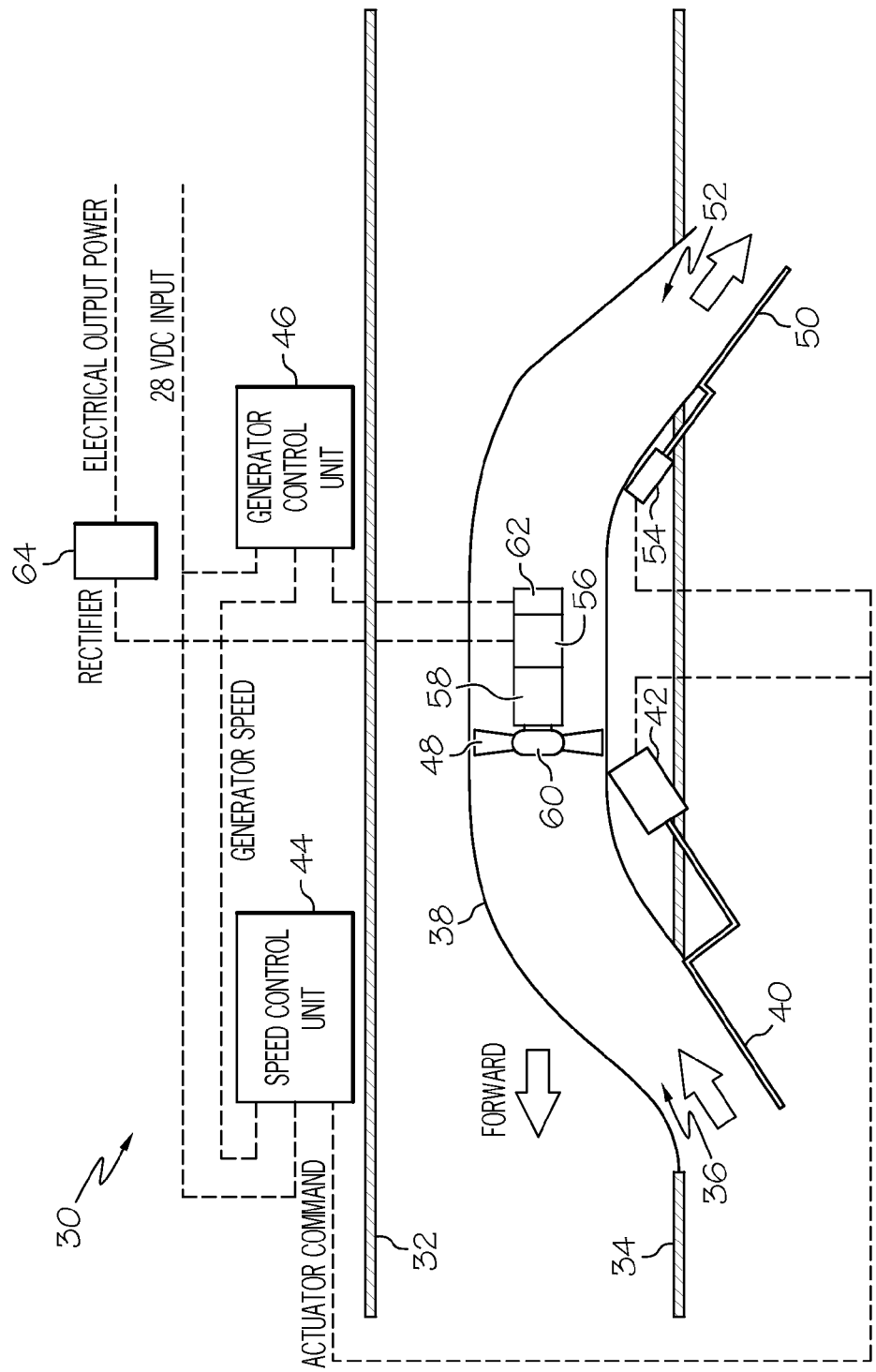
FIG. 3 is cross-sectional view of a ducted ram air turbine disposed in a pod according to another exemplary embodiment of the present invention.
Figure 4:
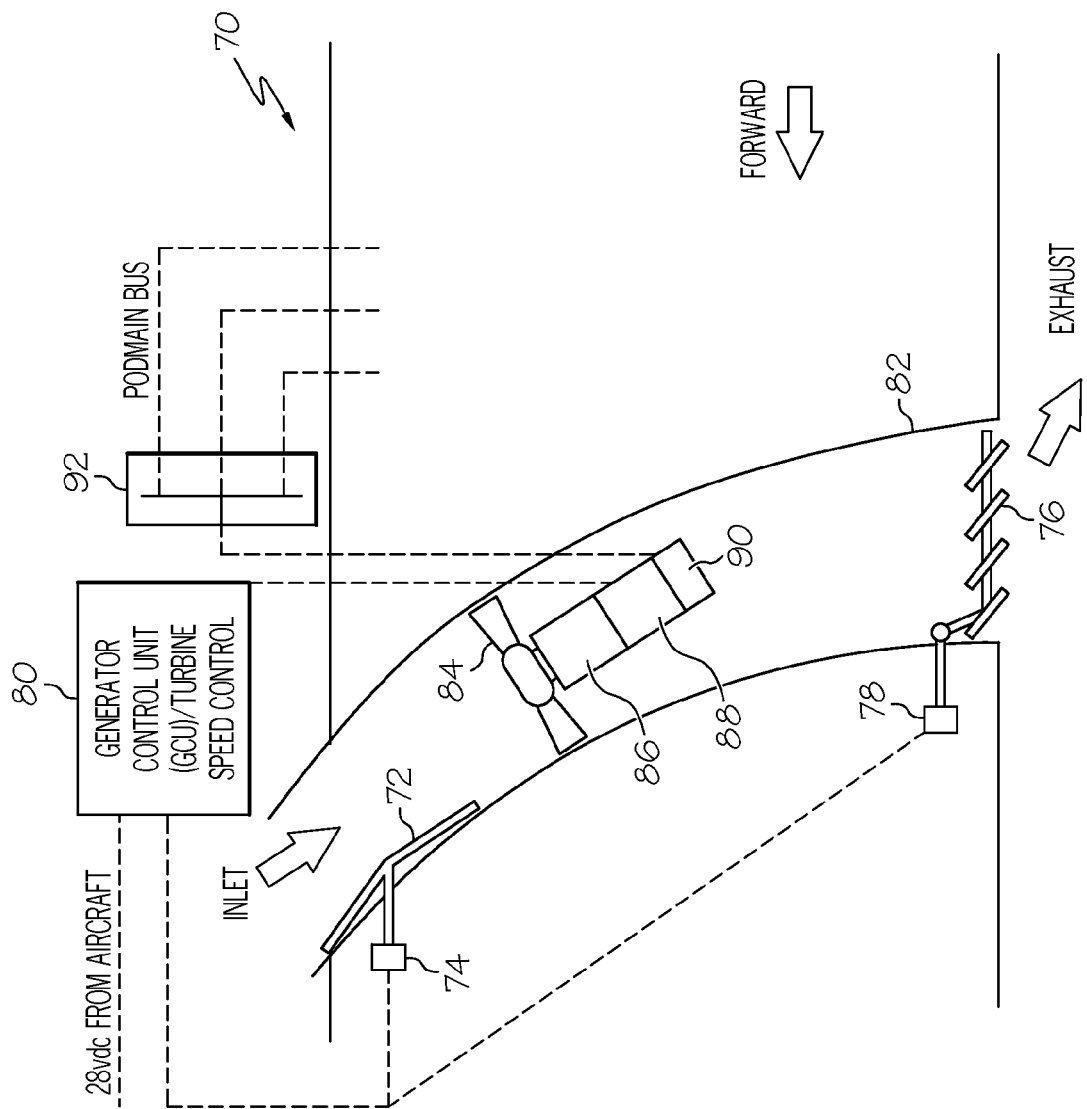
FIG. 4 is cross-sectional view of a ducted ram air turbine disposed in a pad according to a further exemplary embodiment of the present invention.

Referring now to FIG. 3, a pod 30 may be partially defined by an upper outer mold line 32 and a lower outer mold line 34. An inlet 36 for a duct 38 passing through the pod 30 may be formed, for example, in the lower outer mold line 34 of the pod 30. In some embodiments (for example, as shown in FIG. 4), the inlet may be formed in the upper outer mold line of the pod. An inlet door 40 may control the flow of air into the duct 38. The inlet door 40 may variably open and close the inlet 36 of the duct 38. The inlet door 40 may be controlled by a ram inlet actuator 42. The ram inlet actuator 42 may receive an actuator command signal from a speed control unit 44. The speed control unit 44 may receive a generator speed command from a generator control unit (GCU) 46.

A ram air turbine 48 may be disposed inside the duct 38 and may be driven by airflow passing through the duct 38. In addition to being controlled by the inlet door 40, the airflow through the duct 38 may be controlled by an outlet door 50, disposed at an outlet 52 of the duct 38. The outlet door 50 may variably open and close the outlet 52 of the duct 38. Similar to the inlet 36, the outlet 52 may be formed in either the upper outer mold line 32, or the lower outer mold line 34 (as shown in FIG. 3). The outlet door 52 may be controlled by a ram outlet actuator 54. The ram outlet actuator 54 may receive an actuator command signal from the speed control unit 44. The speed control unit 44 may receive a generator speed command from the generator control unit (GCU) 46. In some embodiments, the inlet door 40 and the outlet door 50 may be used to control the speed of the ram air turbine to within about 500 revolutions per minute (rpm).

The ram air turbine 48 may drive a generator 56. A gearbox 58 may be disposed between the ram air turbine 48 and the generator 56 to provide a proper input speed to the generator. For example, in some embodiments, the ram air turbine 48 may be designed to operate from about 7,500 to about 8,000 rpm. The gearbox 58 may have a 2.21:1 gearing to increase the input speed to the generator 56 to an operating speed between about 16,000 to about 18,000 rpm. This example, however, is merely one possible orientation of the generator 56 and the gearbox 58. Depending on the operating speeds of the ram air turbine 48 and the generator 56, the gearbox 58 may not be needed. A rectifier unit 62 may be integrated with the generator 56 to provide a direct current (DC) power output directly from the ram air turbine assembly (which, in the embodiment shown in FIG. 3, the ram air turbine assembly include the ram air turbine 48, the generator 56, the gearbox 58 and the rectifier unit 62). In some embodiments, an external rectifier 64 may be used to convert power from the generator 56 to a desired DC power output.

A coolant pump 60 may be driven by the ram air turbine 48. In some embodiments, the coolant pump 60 may be driven directly from the ram air turbine 48 without the need for a gearbox. The coolant pump 60 may circulate coolant (not shown). The coolant may be used, for example, to cool the electronics, arrays, and antennas of a radar jammer disposed in the pod 30.

The generator control unit 46 may receive a speed signal from the generator 56 and may command the speed control unit 44 to adjust the inlet door 40 and the outlet door 50 to control the speed of the generator 56.

Referring to FIG. 4, a pod 70 may include components similar to those described above, including an inlet door 72, a ram inlet actuator 74, an outlet door 76, a ram outlet actuator 78, and a generator control unit 80 for (either directly or through a speed control unit, as shown and described above in reference to FIG. 3) controlling the airflow through a duct 82. In the embodiment shown in FIG. 4, the inlet door 72 and the outlet door 76 may be formed on opposite sides of the pod 70.

A ram air turbine 84 may include a gearbox 86 and a generator 88. An integrated rectifier 90 may provide DC power to a pod main bus 92 which may distribute the power to various components within the pod 70.

The ducts 38, 82 used in the present invention may have various sizes and shapes. As discussed above, the ducts 38, 82 may have inlets and outlets either on the same side or on opposite sides of the pod. In some embodiments, multiple inlets or multiple outlets may be used to deliver airflow to the ram air turbine. For example, two inlets may combine into a single duct to provide an adequate airflow to drive the ram air turbine. In some embodiments, more than one ducted ram air turbine system may be configured on a single pod.

It should be understood, of course, that the foregoing relates to exemplary embodiments of the invention and that modifications may be made without departing from the spirit and scope of the invention as set forth in the following claims.

We claim:
1. A ducted ram air turbine assembly, comprising:
a duct having an inlet and an outlet;
an inlet door adjustable in position to variably control airflow through the inlet;
a ram inlet actuator coupled to the inlet door to variably control positions of the inlet door to positions intermediate between open and closed;
a ram air turbine disposed inside the duct;
a generator driven by the ram air turbine;
a generator control unit coupled to the generator;
a speed control unit coupled to the generator control unit to receive a generator speed command from the generator control unit, and
the speed control unit being coupled to the ram air inlet actuator to produce a ram inlet actuator command signal such that the ram inlet actuator varies a position of the inlet door responsively to the generator speed command and thereby control airflow through the inlet to achieve a desired generator speed.

2. The ducted ram air turbine assembly of claim 1, wherein the duct is formed through an aircraft pod.

3. The ducted ram air turbine assembly of claim 2, wherein the generator provides power exclusively for components within the pod.

4. The ducted ram air turbine assembly of claim 1, further comprising a rectifier to convert power from the generator to direct current.

5. The ducted ram air turbine assembly of claim 1, wherein the rectifier is integrally formed with the generator.

6. The ducted ram air turbine assembly of claim 1, further comprising a coolant pump controlled directly by the ram air turbine.

7. A ducted ram air turbine assembly, comprising:
a duct having an inlet on a first side of a pod of an aircraft and an outlet on a second side of the pod;
an inlet door;
an outlet door;
a ram inlet actuator coupled to the inlet door to variably control positions of the inlet door to positions intermediate between open and closed and variably control airflow through the inlet;
a ram outlet actuator coupled to the outlet door to variably control positions of the outlet door to positions intermediate between open and closed and variably control airflow through the outlet.
a ram air turbine disposed inside the duct;
a generator driven by the ram air turbine, wherein the generator provides power exclusively to components within the pod;
a generator control unit coupled to the generator to produce a generator speed command; and
a speed control unit coupled to the generator control unit to receive the generator speed command and produce a corresponding ram inlet actuator command signal and a corresponding ram outlet actuator command signal such that the ram inlet actuator varies a position of the inlet door and the ram outlet actuator varies a position of the outlet door to control airflow through the duct responsively to the generator speed command and thereby achieves a desired generator speed.

8. The ducted ram air turbine assembly of claim 7 wherein variable positioning of the inlet and outlet doors results in speed of the turbine being maintained within about 500 revolutions per minute (rpm) during flight of the aircraft.

9. The ducted ram air turbine assembly of claim 7, further comprising a coolant pump controlled directly by the ram air turbine.

10. The ducted air turbine assembly of claim 7, wherein the first side and the second side are on the same side of the pod.

11. The ducted air turbine assembly of claim 7, wherein the first side and the second side are opposite sides of the pod.

12. A pod adapted to attach to an aircraft, comprising:
a radar-jamming system;
a ducted ram air turbine assembly comprising:
   a duct through the pod, the duct having an inlet and an outlet;
   an inlet door adapted to variably open and close the inlet;
   an outlet door adapted to variably open and close the outlet;
   a ram inlet actuator coupled to the inlet door to variably control positions of the inlet door to positions intermediate between open and closed and variably control airflow through the inlet;
   a ram outlet actuator coupled to the outlet door to variably control positions of the outlet door to positions intermediate between open and closed and variably control airflow through the outlet,
   a ram air turbine disposed inside the duct;
   a generator driven by the ram air turbine and providing electrical power for operation of the radar-jamming system;
   a generator control unit coupled to the generator to produce a generator speed command; and
   a speed control unit coupled to the generator control unit to receive the generator speed command and to produce a corresponding ram inlet actuator command signal and a corresponding ram outlet actuator command signal such that the ram inlet actuator varies a position of the inlet door and the ram outlet actuator varies a position of the outlet door to control airflow through the duct responsively to the generator speed command and thereby achieves a desired generator speed.

13. The pod of claim 12, wherein the ducted ram air turbine assembly includes a gearbox adapted to adjust an input speed of the generator.

* * * * *